3,446,639
BASIC REFRACTORY FOR OXYGEN
CONVERTERS
James A. Crookston and William R. Gritton, Mexico, Mo., assignors, by mesne assignments, to A. P. Green Refractories Co., Mexico, Mo., a corporation of Missouri
No Drawing. Filed Oct. 25, 1966, Ser. No. 589,198
Int. Cl. C04b 35/02, 35/04
U.S. Cl. 106—56                                                                 9 Claims

ABSTRACT OF THE DISCLOSURE

A tar bonded refractory shape comprising 60–80% of −3+20 coke covered grain, 5–15% −20 mesh coke covered grain and 10–30% uncoked basic aggregate of −65 mesh and 3–10% tar bonding agent.

---

The present invention relates to an improved basic refractory for oxygen converters and to a method of making same. The invention particularly relates to a refractory having a high residual carbon value.

The oxygen converter process, also known as the LD process, Kaldo process, or oxygen steelmaking process, is a relatively recent development in the production of steel. It permits the rapid production of steel by use of gaseous oxygen which is blown onto the surface of metal inside the converters, thus greatly accelerating the steelmaking reactions.

Since basic slags are used in the processing, basic refractories are required for lining the vessels. These basic refractories generally are comprised of aggregates of dead-burned magnesite, dead-burned dolomite, dead-burned lime, or combinations of them, bonded with tar or pitch. The tar or pitch binder in such refractories imparts, first, the green strength and, later, under service conditions of high temperature, a carbon bond, which is developed due to the coking of the tar or pitch originally added to provide green strength. Much research has been directed toward the properties of refractories bonded with pitch of varying types. High residual carbon contents in these products are desirable to resist wetting and erosion by slag and metal. The residual carbon is a measure of the coked carbonaceous matter which remains in the product after heat treatment and after that heat treatment has removed the low temperature volatiles and hydrogen content from the original pitch, thus leaving only carbon in the form of coke. After exposure to high temperatures, the coked pitch affords the principal bonding medium in the refractories, and the coked pitch residuum offers the necessary resistance to slag erosion in the converter environment. Therefore, the higher the residual carbon value can be made, the better will be the resistance of these brick to slag in service.

In addition, the tar or pitch binder also gives protection from hydration in refractories containing dead-burned dolomite.

It is the principal object of this invention to provide a superior tar bonded brick product, and a method for producing it, which is characterized by a higher residual carbon value compared to the usual refractories bonded with tar or pitch. The tar or pitch materials may be derivatives of either coal or petroleum products.

It is a further object of this invention to provide a superior tar bonded product, and the method of producing it, which possesses some carbon bond prior to its exposure to service conditions and which tends to form additional carbon bonding in service.

To increase the number value of residual carbon results it has been proposed to add a very high softening point pitch, in granulated form, to the mix of refractory aggregates, after which the composite is bonded with a heated, liquid pitch binder of lower softening point. Other proposed methods include the additions of graphite or carbon black materials by means similar to that noted for the addition of granulated pitch.

In the present invention, the residual carbon content of basic tar bonded refractories is increased by introducing into mixes, refractory aggregates which contain on their surfaces and in their pores, a previously formed coating of coked pitch. The aggregates coated with coked pitch can be comprised of dead-burned magnesite, dead-burned dolomite, dead-burned lime, or mixtures of the foregoing. The composition of these grains is not a critical aspect of the present invention.

The precoated aggregates of material are next appropriately sized into a major portion of −3+20 mesh and incorporated into mixes to which a minor portion of new and uncoated fine material of 65 mesh or finer, is supplemented, along with a heated, liquid pitch binder. The composite mix is then formed under pressures into conventional refractory shapes.

The methods of coating the basic refractory aggregates with pitch, followed by coking may consist of any of the following procedures:

(1) Refractory aggregates are preheated to elevated temperatures ranging from 1000° F. to 2500° F. and heated liquid pitch passed over the aggregates. By this practice, the coating and coking procedures are accomplished simultaneously, since the heat present in the grain is sufficient to drive low temperature volatiles from the pitch coating and to carbonize the residuum.

(2) A second procedure consists of coating ambient aggregate with heated liquid pitch followed by coking the coated aggregates at temperatures ranging from 1000° F. to 2500° F., in the absence of oxygen.

(3) The third procedure consists of forming conventional tar bonded basic refractories, which are in turn coked at temperatures in the range of 1000° F. to 2500° F., in the absence of oxygen. The coked refractory units are then ground, by conventional techniques practiced by the industry, into appropriate grain size fractions.

By procedures 2 and 3 preceding, the prevention of oxygen to materials during the coking operation may be accomplished in any of several ways, such as protecting the ware by materials carbonaceous in nature, or by using a neutral to reducing furnace atmosphere during the heating cycle.

The temperature to be used for coking may vary, depending on the time available to accomplish the operation. By procedures 2 and 3, it has been found best at temperatures in the range of 1000° F. to 1500° F., to heat a minimum of three (3) hours at the peak temperature to insure adequate heat transfer from the furnace atmospheres to the materials being coked.

The pitch softening points used in the practice of this invention may range from 150° F. to 225° F.

The following example is cited to point out the practices of this invention:

Example No. 1

High purity, dead-burned magnesite having a composition of 96% minimum MgO content is processed by first manufacturing conventional tar bonded brick of the following mix:

| Component | Tyler sieve size | Percentage |
|---|---|---|
| Dead-burned magnesite (96% MgO) | −4+10 | 32.8 |
| Do | −10+28 | 28.2 |
| Do | −65 | 32.9 |
| 180° F. softening point pitch | | 6.1 |
| | | 100 |

The mixes are formed into brick under high pressure and are coked at a temperature of 1200° F. for a minimum time of three (3) hours at the peak temperature of 1200° F., in the absence of oxygen.

Following the coking operation, the brick units are cooled to ambient temperature and ground to a Tyler sieve size of 3 mesh and finer. The 3 mesh and finer fraction produced initially is subsequently separated into sizings of 3 to 20 mesh and 20 mesh and fines.

The properties of ⅜ mesh (Tyler) grain produced by this processing is as follows and is compared to the properties of the high purity dead-burned magnesite employed in making the brick as aforesaid.

| Property | Coated aggregate | Uncoated aggregate |
|---|---|---|
| Apparent grain density, gm./cc | 2.93 | 3.15 |
| Apparent porosity, percent | 8.95 | 3.85 |
| Apparent specific gravity | 3.21 | 3.26 |
| Loss on ignition, percent | 4–6 | Negligible |

As can be noted, the coked coating of pitch reduces the apparent density of the grain due to its less dense and porous structure.

Brick are manufactured from coated grain along with supplemental uncoated fines according to the following mix:

| Component | Tyler sieve size | Percentage |
|---|---|---|
| Dead-burned magnesites: | | |
| Aggregate with coked coating | −3+20 | 65 |
| Do | 20M/F | 8 |
| Do | −65 | 21 |
| 180° F. softening point pitch | | 6 |
| | | 100 |

The properties of the brick formed under high pressures from the mix noted are shown in the following table and compared to properties of a conventionally tar bonded brick made from similar but uncoated grain.

| Property | Brick made with coated grain | Brick made with uncoated grain |
|---|---|---|
| Density | 174 | 182 |
| Modulus of rupture, p.s.i. | 1,200–1,600 | 1,740 |
| Loss on ignition [1] | 8.6 | 6.1 |

[1] The increased loss on ignition of the mix using grain coated with pitch reflects the increased residual carbon content of the product, in comparison to that obtainable with a conventionally tar bonded product. The loss on ignition results of brick made from grain coated with coked pitch varies slightly due to some inherent variations in the processing which gives slightly varying thicknesses in the original pitch coatings.

The decreased apparent density of the grains coated with coke is reflected in the lower density of the brick produced, when compared to conventional brick.

Experimental testing of products made by the practice of this invention have shown them to perform better than conventional products indicating the value of this means for increasing the residual carbon content of basic tar bonded refractories.

Also useful in this invention is the use of reclaimed tar bonded refractories from service which affords a means of arriving at basic refractory aggregates containing a coked coating similar to the means noted for producing such grain by Procedure 3.

Thus it is seen that the present invention provides several alternate means for appreciably increasing the residual carbon values of basic tar bonded refractories wherein aggregates possessing a coating of coked pitch are incorporated into mixes later bonded with pitch and pressed into conventional refractory shapes by conventional practices of the trade. The refractories may be comprised of basic aggregates of dead-burned magnesite, dead-burned dolomite, dead-burned lime, or combinations of same, the compositions not being a limitation on the invention. Also, the pitches employed are not limiting on the practice of the invention and may vary widely in physical characteristics with similar degrees of resultant success. The particle size and the ranges of amounts of the ingredients are important to the success of the invention, however.

The basic refractory grain comprises a major portion which is coated with coke and a minor portion which is coke-free. The coke covered particles are 50–80% of the composition. The coke covered particles are −3 mesh and finer and preferably are 60–80% −3 +20 mesh and 5–15% −20 mesh. The coke covered particles have a residual carbon value of 2–7%.

The uncoated particles are 20 to 40% and preferably 10 to 30% −65 mesh and finer. The tar bonding agent for the mix is 3 to 10%. The tar bonding agent preferably has its softening point in the range of 150° F. to 225° F.

This invention is intended to cover all changes and modifications of the examples of the invention herein chosen for purposes of the disclosure, which do not constitute departures from the spirit and scope of the invention.

What is claimed is:

1. A tar bonded refractory shape consisting essentially of
  (a) a major portion of basic refractory grain, said grain particles being coated with coke, a substantial proportion of the coke covered grain being −3+20 mesh with the remainder being 20 mesh and finer, the residual carbon of the particles being about 2% to about 7%,
  (b) a minor portion of uncoked basic refractory aggregate of −65 mesh,
  (c) and from about 3% to about 10% tar bonding agent.

2. The composition of claim 1 wherein the coke covered basic grain comprises about 50–80% of the composition, and the uncoked grain comprises about 20 to 40% of the composition.

3. The composition of claim 1 wherein the coke covered grain of −3+20 comprises about 60 to 80% of the composition, the coke covered grain of −20 mesh comprises about 5 to 15% of the composition and the uncoked grain comprises about 10 to 30% of the composition.

4. The composition of claim 1 wherein the coke covered grain is about 65% −3+20 mesh and 8% −20 mesh, and including about 21% of the uncoked particles aggregate, and about 6% pitch having its softening point within the range of 150° F. to 225° F.

5. A method of making a tar bonded basic refractory shape comprising the steps of
  (a) combining a major portion of coke coated basic refractory particles of −3 mesh and finer and residual carbon of about 2 to about 7% with a tar binding agent and a minor portion of uncoked basic refractory particles of −65 mesh and finer, and
  (b) forming the mass into a refractory shape.

6. The method of claim 5 including the steps of coating basic refractory particles with tar, forming the tar coated refractory particles into shapes, coking the shapes at 1000° F.–2500° F., and crushing the coked shapes to form the coke coated particles of −3 mesh and finer.

7. The method of claim 5 including the steps of heating basic refractory particles to 1000–2500° F. and applying tar to the heated particles to simultaneously coat and coke the particle to form the coke coated particles of −3 mesh and finer.

8. The process of claim 5 wherein the coke coated refractory particles are 60 to 80% −3+20 mesh and 5 to 15% −20 mesh and finer and the uncoated refractory particles are 10 to 30% −65 mesh and finer and are combined with 3 to 10% tar.

9. The process of claim 5 wherein the coke coated particles are about 65% −3+20 mesh, about 8% −20 mesh and the uncoated particles are about 21% −65 mesh and are combined with about 6% tar.

References Cited

UNITED STATES PATENTS 3,215,546 11/1965 Wilson et al. _____ 106—56
3,265,513 8/1966 Tidridge et al. _____ 106—56

JAMES E. POER, *Primary Examiner.*

U.S. Cl. X.R.

106—58, 63

PO-1050
(5/69)

UNITED STATES PATENT OFFICE
CERTIFICATE OF CORRECTION

Patent No. 3,446,639  Dated May 27, 1969

Inventor(s) James A. Crookston and William R. Gritton

It is certified that error appears in the above-identified patent and that said Letters Patent are hereby corrected as shown below:

Column 3, line 48, delete "Do" and substitute therefor -- Aggregate without coked coating --

Line 48 should read:

Aggregate without coked coating        - 65         21

SIGNED AND
SEALED
SEP 30 1969

(SEAL)
Attest:

Edward M. Fletcher, Jr.
Attesting Officer

WILLIAM E. SCHUYLER, JR.
Commissioner of Patents